United States Patent
Kobayashi et al.

[11] Patent Number: 6,045,744
[45] Date of Patent: *Apr. 4, 2000

[54] FOIL-DECORATING INJECTION MOLDING MACHINE AND FOIL-DECORATING INJECTION MOLDING METHOD

[75] Inventors: Kazuhisa Kobayashi; Masayuki Shibata; Hirohisa Yoshikawa, all of Tokyo-To, Japan

[73] Assignee: Dai Nippon Printing Co., Ltd., Tokyo-To, Japan

[ * ] Notice: This patent is subject to a terminal disclaimer.

[21] Appl. No.: 09/160,939

[22] Filed: Sep. 25, 1998

Related U.S. Application Data

[62] Division of application No. 08/753,775, Dec. 2, 1996, Pat. No. 5,851,560.

[30] Foreign Application Priority Data

Nov. 30, 1995 [JP] Japan ..................................... 7-313104

[51] Int. Cl.[7] .................................................. B29C 45/14

[52] U.S. Cl. ......................... 264/511; 264/513; 264/267; 264/269; 425/127; 425/129.1; 425/388

[58] Field of Search ..................................... 264/511, 513, 264/267, 269; 425/388, 127, 129.1

[56] References Cited

U.S. PATENT DOCUMENTS

| | | | |
|---|---|---|---|
| 4,360,329 | 11/1982 | Hatakeyama | 425/112 |
| 4,755,120 | 7/1988 | Onneneberg et al. | 425/125 |
| 4,994,224 | 2/1991 | Itoh et al. | 264/247 |
| 5,415,536 | 5/1995 | Ohno | 425/121 |

FOREIGN PATENT DOCUMENTS

5-96575  4/1993  Japan .

*Primary Examiner*—Jan H. Silbaugh
*Assistant Examiner*—Edmund H. Lee
*Attorney, Agent, or Firm*—Morgan & Finnegan, L.L.P.

[57] ABSTRACT

A foil-decorating injection molding method including using a foil-decorating injection molding machine with an injection mold having a male mold and a female mold. The female mold has a cavity surface for forming a cavity, and a parting surface having an outer peripheral section on which to hold a decorative sheet, and an inner peripheral section extending between the inner edge of the outer peripheral section of the parting surface and the edge of the cavity surface in a concavely curved shape to allow the expansion of a peripheral portion of the decorative sheet around a decorating portion of the same during preforming. This reduces local strains in the decorative portion of the sheet and ensures a uniform thickness distribution of the sheet to prevent breaking and creasing of the sheet.

7 Claims, 5 Drawing Sheets

FOIL-DECORATING INJECTION MOLDING MACHINE AND FOIL-DECORATING INJECTION MOLDING METHOD

This is a divisional of application Ser. No. 08/753,775 filed Dec. 2, 1996 now U.S. Pat. No. 5,851,560.

BACKGROUND OF THE INVENTION

1. Field of the Invention

The present invention relates to a foil-decorating injection molding machine which uses a decorative sheet carrying patterns, characters, etc. to produce a molding decorated by the patterns, characters, etc. of the decorative sheet, and to a foil-decorating injection molding method carried out, using the foil-decorating injection molding machine.

2. Description of the Related Art

A generally known foil-decorating injection molding method, such as disclosed in U.S. Pat. No. 4,639,341 to Hanamoto et al., which forms a molding by injection molding and attaches a web-fed or sheet-fed decorative sheet to the molding simultaneously, comprises steps of feeding the decorative sheet into a space between a male mold and a female mold of an injection mold, preheating the decorative sheet by a hot plate or the like for softening, closely attaching the softened decorative sheet to the cavity surface of the female mold by vacuum forming and/or pressure forming, joining together the male mold and the female mold to close the injection mold, and injecting a molten resin through the male mold into the cavity to injection-mold the molding.

A laminated decorative sheet or a transfer decorative sheet is used depending on the type of a product to be produced. If a laminated decorative sheet is used, the laminated decorative sheet is attached integrally to the surface of an injection-molded molding to form a decorative layer. If a transfer decorative sheet, which has a substrate and a decorative transfer layer formed on the substrate, is used, the transfer decorative sheet is attached to the surface of a molding, and then the substrate is removed from the molding so that only the decorative transfer layer remains on the surface of the molding.

Figure 8:
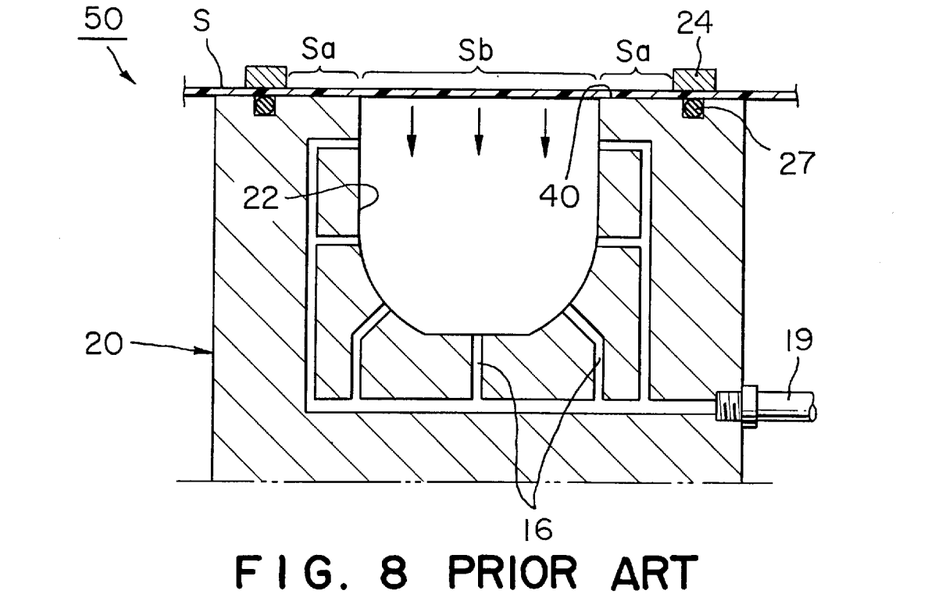
FIG. 8 is a schematic sectional view of a female mold included in an injection mold employed in a conventional foil-decorating injection molding machine.
Figure 9:
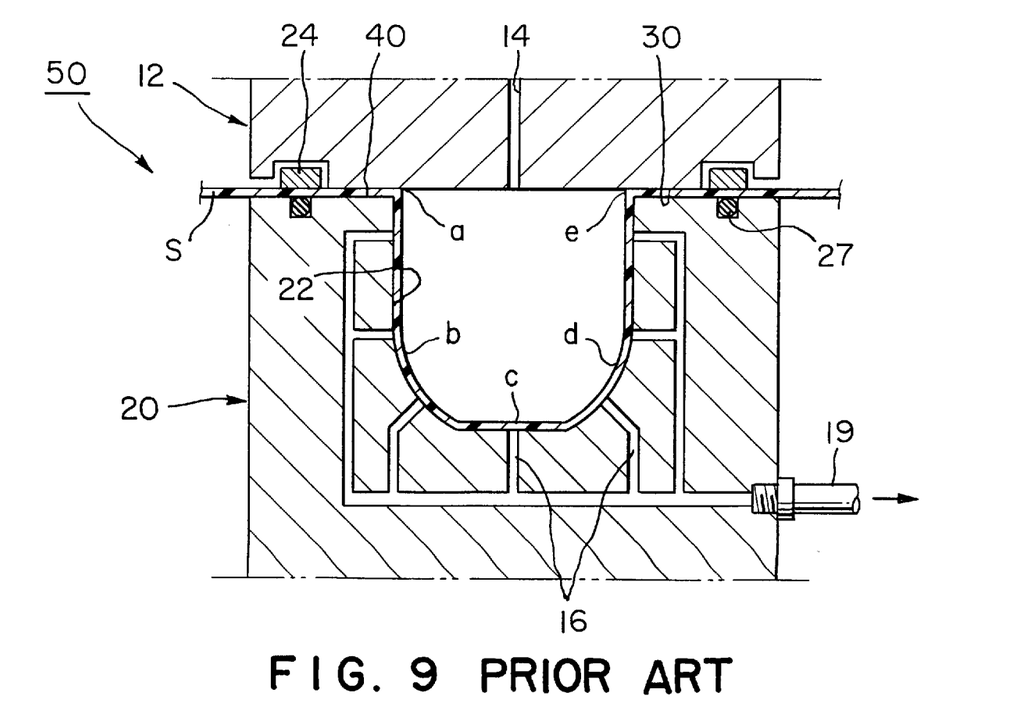
FIG. 9 is a schematic sectional view of the injection mold including the female mold of FIG. 1 in a closed state.

A foil-decorating injection molding machine provided with an injection mold having a male mold and a female mold forming a cavity is used for simultaneous injection molding and foil decoration. FIG. 8 shows a female mold of an injection mold 50 and associated parts employed in a typical, conventional foil-decorating injection molding machine, and FIG. 9 shows the injection mold 50 of FIG. 8 in a closed state. The injection mold 50 is designed for forming a molding 1 (FIG. 5) of a height H of 50 mm, having a large end of a diameter D of 50 mm and a small end of a diameter E of 44 mm, and having an outer surface coated with a laminated decorative sheet S. The injection mold 50 has a male mold 12 and a female mold 20. The male mold 12 is provided with a runner 14 in its central portion. A molten resin is injected through the runner 14 into a cavity formed by the male mold 12 and the female mold 20 by an injection unit. The female mold 20 has a cavity surface 22 corresponding to the outer surface of the molding 1. A ring-shaped sheet holding member 24 is supported at its four corners by a sliding rod for movement relative to the female mold 20 to hold a decorative sheet S fixedly on a parting surface of the female mold 20 merging into the cavity surface 22. The sheet holding member 24 is driven for movement by a driving mechanism, such as a hydraulic cylinder actuator, installed on the bottom of the female mold 20. An elastic O-ring 27 is fitted in an endless groove formed in the parting surface 40 of the female mold 20 so as to correspond to the sheet holding member 24 for hermetic sealing. The female mold 20 is provided with suction holes 16 opening in the cavity surface 22 to attract the decorative sheet S closely to the cavity surface 22 by suction for preforming. The suction holes 16 are connected to a suction pipe 19 which in turn is connected to a vacuum source. If necessary, the male mold 12 may be provided with a compressed air supply holes connected to a compressed air source to blow compressed air against the decorative sheet S for preforming.

In the operation of the foil-decorating injection molding machine provided with the injection mold 50 thus constructed, a decorative sheet S for the next injection molding cycle is placed on the parting surface 40 of the female mold 20 behind the sheet holding member 24, the decorative sheet S is held fixedly on the parting surface 40 of the female mold 20 by the sheet holding member 24, the decorative sheet S is heated by a hot plate or the like for hot softening, a suction is applied through the suction holes 16 to the decorative sheet S in order that the decorative sheet S is extended along and in close contact with the cavity surface of the female mold 20 for performing, the female mold 20 is advanced toward the male mold 12 to close the injection mold 50 so that the decorative sheet S is held between the parting surface 40 of the female mold 20 and the parting surface 30 of the male mold 12, a molten resin is injected through the runner 14 of the male mold 12 into the cavity 22 defined by the male mold 12 and the female mold 20 for injection molding, the injection mold 50 is cooled for a predetermined time, the female mold 20 is moved away from the male mold 12 to open the injection mold 50, and then a decorated molding 1 decorated by the decorative sheet S is removed from the female mold 20.

In the conventional foil-decorating injection molding machine provided with the injection mold 50, the decorative sheet S is expanded locally and irregularly because the female mold 20 has a flat parting surface 40; that is, a decorating portion Sb (FIG. 8), i.e., a portion to be attached to a molding, of the decorative sheet S corresponding to the cavity 22 is expanded far more greatly than a portion Sa of the decorative sheet S lying on the parting surface 40, because the portion Sa, when heated for softening, cools off and hardens quickly due to the dissipation of heat given thereto by heat transfer from the portion Sa to the female mold 20 by conduction, and the expansion of the portion Sa is obstructed by the frictional resistance of the parting surface 40 of the female mold 20. On the other hand, the portion Sb floating over the cavity surface 22 is not restrained from expansion and hence the portion Sb is expanded locally and concentratedly. When the cavity surface 22 has a shape resembling the shape of a die surface for deep drawing, the decorative sheet S is liable to be broken or creased to cause faulty molding. More specifically, a strain is expressed by a change in length per unit undistorted length, i.e., a strain $\Delta L/L$ where $\Delta L$ is a change in length of an object of an undistorted length L. Therefore, even if the change $\Delta L$ in length is the same, an object having a shorter length L has a greater strain $\Delta L/L$ and an object having a greater length L has a smaller strain $\Delta L/L$.

SUMMARY OF THE INVENTION

The present invention has been made in view of the foregoing problems and it is an object of the present invention to provide a foil-decorating injection molding machine capable of reducing a local strain in an decorating portion of a decorative sheet to be attached to a molding, of uniformly expanding the decorating portion of the decorative sheet so that the expanded decorating portion has a uniform thickness distribution without breaking and creasing the decorating portion of the decorative sheet.

Another object of the present invention is to provide a foil-decorating injection molding method carried out, using the foregoing foil-decorating injection molding machine.

According to a first aspect of the present invention, a foil-decorating injection molding machine comprises: an injection mold having a female mold provided with a cavity surface for forming a cavity, and a parting surface, and a male mold having a parting surface to be brought into close contact with the parting surface of the female mold when the injection mold is closed and capable of being moved relative to the female mold; and a decorative sheet feed mechanism for feeding a decorative sheet into a space between the respective parting surfaces of the male mold and the female mold. The parting surface of the female mold has an outer peripheral section for holding the decorative sheet, and an inner peripheral section extending between the inner edge of the outer peripheral section and the edge of the cavity surface in a concavely curved shape.

Preferably, the female mold is provided with suction holes opening in the cavity surface and/or the inner peripheral section of the parting surface, and connected to a vacuum source to make the decorative sheet stick closely to the cavity surface.

In another aspect of the present invention, a foil-decorating injection molding method comprises steps of providing an injection mold having a female mold provided with a cavity surface for forming a cavity, a parting surface having an outer peripheral section for holding the decorative sheet, and an inner peripheral section extending between the inner edge of the outer peripheral section and the edge of the cavity surface in a concavely curved shape and suction holes opening in the cavity surface and the inner peripheral section of the parting surface and connected to a vacuum source, and a male mold having a parting surface to be brought into close contact with the parting surface of the female mold when the injection mold is closed and capable of being moved relative to the female mold; fixedly holding a decorative sheet on the parting surface of the female mold; expanding the decorative sheet so that the decorative sheet sticks closely to the cavity surface and the inner peripheral section of the parting surface of the female mold by applying suction to the decorative sheet through the suction holes; clamping together the male mold and the female mold so that the decorative sheet is held between the respective parting surfaces of the male mold and the female mold; and injecting a molten resin through the male mold into the cavity defined by the male mold and the female mold for injection molding.

In the foil-decorating injection molding machine in accordance with the present invention, the parting surface of the female mold has at least the outer peripheral section and the inner peripheral section, and the inner peripheral section of the parting surface is formed in a concavely curved shape. Consequently, a portion of the decorative sheet corresponding to the inner peripheral section of the parting surface of the female mold can be expanded to some extent and is able to take part of a distortion ΔL of the decorative sheet. Therefore, a strain ΔL/L in the decorative sheet strained on the foil-decorating injection molding machine in accordance with the present invention is smaller than that in a decorative sheet on the conventional foil-decorating injection molding machine provided with the injection mold shown in FIGS. 8 and 9, because the length L subject to expansion of the decorative sheet on the foil-decorating injection molding machine in accordance with the present invention is greater than that of the same decorative sheet on the conventional foil-decorating injection molding machine. Thus, the strain in the decorating portion of the decorative sheet is reduced, the uniformity in thickness of the expanded decorating portion of the decorative sheet is improved and hence the decorative sheet is difficult to be broken or creased to cause faulty injection molding.

According to the present invention, the male and the female mold of the injection mold are made of a metal, such as iron, or a ceramic material, and may be sectional molds depending on the shape of a molding to be formed. If the preforming of the decorating sheet is necessary, the foil-decorating injection molding machine is provided with a hot plate for heating and softening the decorative sheet in combination with the injection mold, and small holes for vacuum suction and compressed air supply are formed in the female and the male molds, respectively. The suction holes may be formed so as to open in only the cavity surface, but may be formed so as to open in both the cavity surface and the inner peripheral section of the parting surface of the female mold.

The decorating sheet may be a unit pattern section cut out for each injection molding cycle from a rolled web having a plurality of unit pattern sections or may be a sheet-fed decorating sheet of a predetermined size. Unit decorating pattern sections of a web may be fed successively to a molding position between the male mold and the female mold by a roll-to-roll system which feeds the web having the unit decorating pattern sections to the molding position for successive injection molding cycles by a web feed mechanism and takes up the web by a web take-up mechanism or decorative sheets may successively be fed one at a time to the molding position by an industrial robot (manipulator) provided with suction cups capable of holding the decorating sheet. However, the roll-to-roll system is recommendable in view of productivity.

The foil-decorating injection molding machine may be provided with a clamping means for fixedly holding the decorative sheet on the parting surface of the female mold. The clamping means may comprise a holding frame, and the clamping means may be driven by a driving means for driving a mold clamping mechanism, a driving means for driving an ejector pin mechanism, or a driving means, such as a hydraulic actuator, specially for driving the clamping means.

The decorative sheet may be a laminated coating decorative sheet having a substrate to be attached to a molding to coat the surface of the molding, and a decorative layer formed on the substrate, or a transfer decorative sheet having a decorative layer and a substrate carrying the decorative layer, to be attached to a molding temporarily and to be removed from the molding after the transference of the decorative layer to the molding.

The substrate may be a sheet of a thermoplastic resin, such as a polyvinyl chloride resin, an acrylic resin, a polystyrene resin, an ABS resin, a polycarbonate resin, a polyester resin, a polypropylene resin or a polyethylene resin. The thickness of the substrate may be in the range of about 20 to about 500 μm. The decorative layer may be a layer carrying a printed pattern, a layer of a colored or transparent film or a layer of a metal thin film.

The transfer layer, such as a pattern layer or the like, of the transfer decorative sheet is transferred to a molding. If necessary, a releasing layer may be formed on the substrate. The transfer layer may be composed of a releasing layer, a decorative layer and an adhesive layer as occasion demands. The decorative layer may be a pattern layer, a layer of a metal thin film for partially or entirely coating the surface of the molding, or a functional layer, such as a layer of a hard film, a layer of an antihazing film or a layer of a conductive film.

The substrate may be a flexible thermoplastic resin film of a polyamide resin, such as nylon 6 or nylon 66, a polyolefine resin, such as a polyethylene resin or a polypropylene resin, or a polyvinyl chloride resin, or a laminate of layers of at least some of those materials.

A resin for injection molding is selected taking into consideration the required physical properties and the cost of a molding to be produced from generally known thermoplastic resins including ABS resins (acrylonitrile-butadiene-styrene resin), polystyrene resins, vinyl chloride resins, acrylic resins and polycarbonate resins, two-component setting resins and catalytic setting resins including polyurethane resins and polyester resins.

The above and other objects, features and advantages of the present invention will become more apparent from the following description taken in connection with the accompanying drawings.

DETAILED DESCRIPTION OF THE PREFERRED EMBODIMENTS

A foil-decorating injection molding machine in a preferred embodiment according to the present invention will be described with reference to FIGS. 1 and 2, in which parts like or corresponding to those of the foil-decorating injection molding machine previously described with reference to FIGS. 8 and 9 are designated by the same reference characters and the description thereof will be omitted to avoid duplication.

Figure 1:
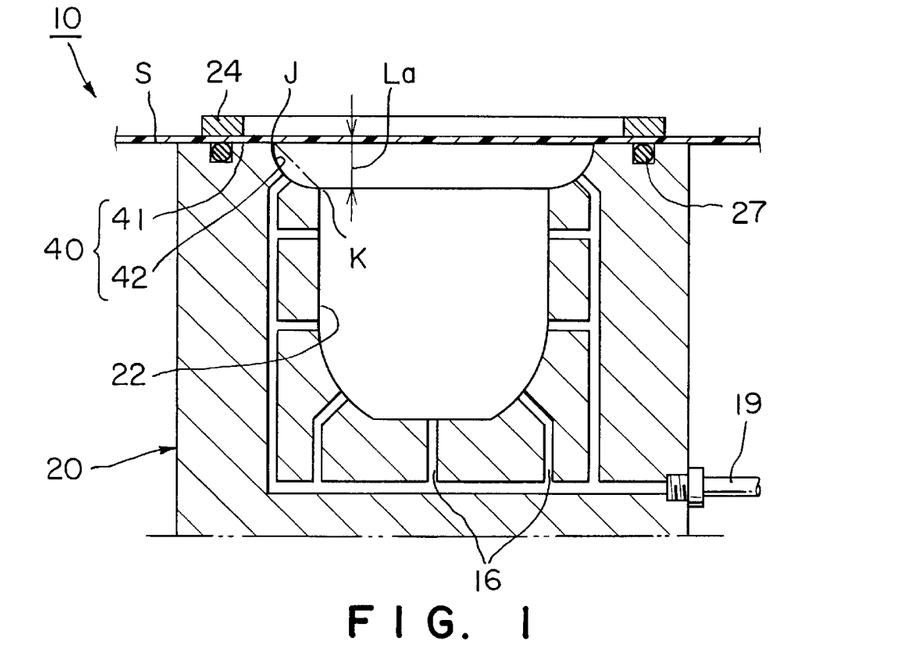
FIG. 1 is a schematic sectional view of a female mold included in an injection mold employed in a foil-decorating injection molding machine in a preferred embodiment according to the present invention.
Figure 2:
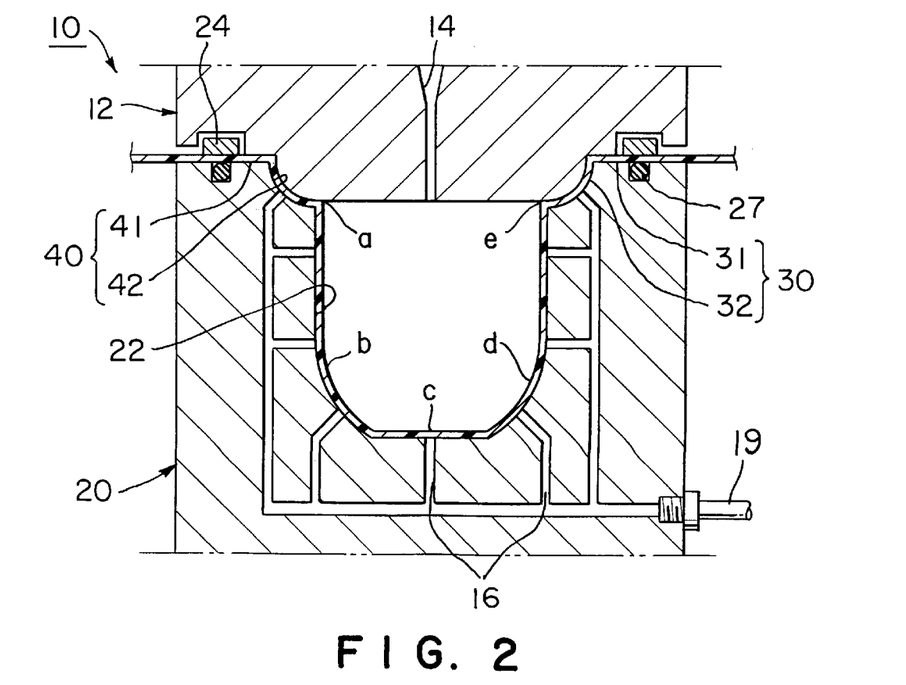
FIG. 2 is a schematic sectional view of the injection mold including the female mold of FIG. 1 in a closed state.

Referring to FIGS. 1 and 2, an injection mold 10 included in the foil-decorating injection molding machine is designed for forming a molding 1 (FIG. 5) of a height H of 50 mm, having a large end of a diameter D of 50 mm and a small end of a diameter E of 44 mm, and having an outer surface coated with a laminated decorative sheet S, and has a male mold 12 and a female mold 20. The female mold 20 has a parting surface 40 having an outer peripheral section 41, and an inner peripheral section 42 continuous with a cavity surface 22. The outer peripheral section 41 and the inner peripheral section 42 of the parting surface 40 of the female mold 20 mate with an outer peripheral section 31 and an inner peripheral section 32 of the male mold 12, respectively, to hold the decorative sheet S therebetween and to define a sealed cavity.

The outer peripheral section 41 of the parting surface 40 is a flat surface on which a peripheral portion of the decorative sheet S is held fixedly by a sheet holding member 24. The inner peripheral section 42 of the parting surface 40 extends between the inner edge J of the outer peripheral section 41 and the edge K of the cavity surface 22 and is formed in a concavely curved shape. The depth La of a recess forming the inner peripheral section 42 of the parting surface 40 is 10 mm in this embodiment.

When the foil-decorating injection molding machine provided with the injection mold 10 is operated for foil-decorating injection molding, the decorative sheet S for the next injection molding cycle is placed on the parting surface 40 having the outer peripheral section 41 and the inner peripheral section 42 of the female mold 20 behind the sheet holding member 24, the decorative sheet S is held fixedly on the outer peripheral section 41 of the parting surface 40 of the female mold 20 by the sheet holding member 24, the decorative sheet S is heated by a hot plate or the like for hot softening, a suction is applied through the suction holes 16 to the decorative sheet S and, if necessary, compressed air is blown against the decorative sheet S from the male mold 12 or the hot plate in order that the decorative sheet S is extended along and in close contact with the cavity surface 22 of the female mold 20 for a preforming process, the female mold 20 is advanced relative to the male mold 12 to close the injection mold 10 with the decorative sheet S held between the outer peripheral section 41 and the inner peripheral section 42 of the parting surface 40 of the female mold 20 and the outer peripheral section 31 and the inner peripheral section 32 of the parting surface 30 of the male mold 12, a molten resin is injected through the runner 14 of the male mold 12 into the cavity for injection molding, the injection mold 10 is cooled for a predetermined time, the female mold 20 is moved away from the male mold 12 to open the injection mold 10, and then a decorated molding 1 decorated by the decorative sheet S is removed from the injection mold 10.

Figure 3:
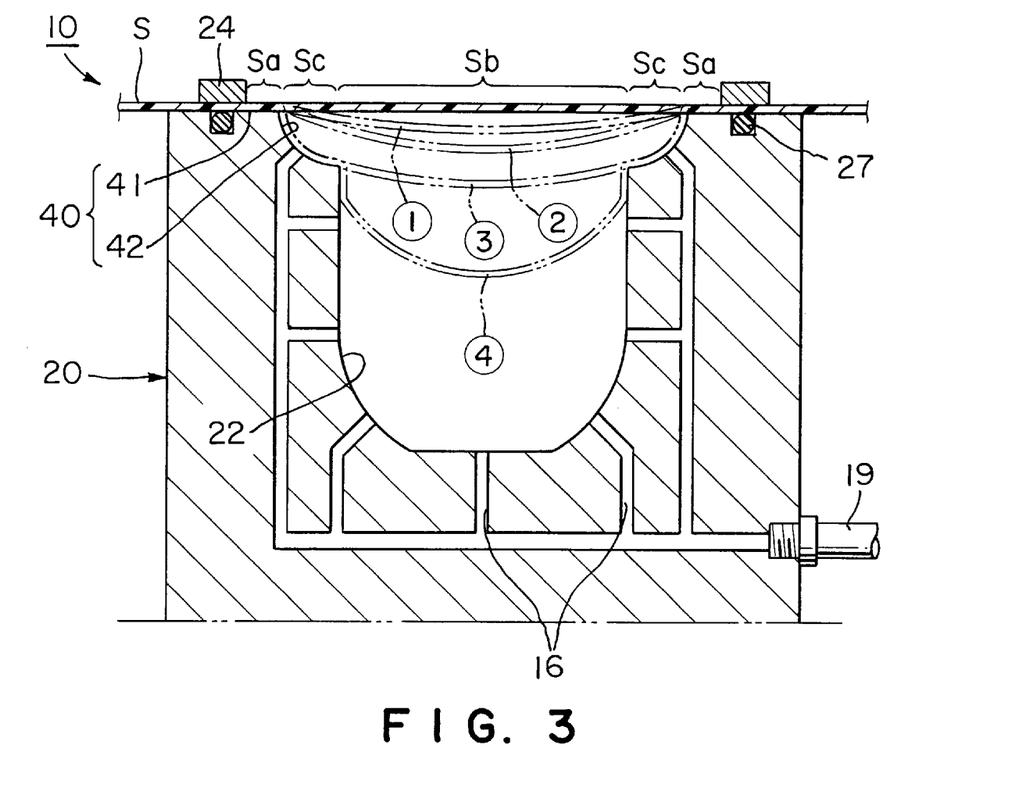
FIG. 3 is a schematic sectional view of the injection mold of FIG. 2 in a state during a preforming process.

In the preforming process, the decorative sheet S is distorted gradually in the order of shapes ①-②-③-④ indicated by alternate long and two short dashes lines in FIG. 3. During a process of distortion from the shape ① in which a potion Sa of the decorative sheet S is first brought in contact with the parting surface 40 of the female mold 20 to the shape ③ in which a portion Sc of the decorative sheet S is in contact with the inner peripheral section 42 of the parting surface 40 of the female mold 20, portions of the decorative sheet S other than the portion Sa in contact with the outer peripheral section 41 of the parting surface 40, i.e., a portion Sb and the portion Sc of the decorative sheet S, are expanded substantially uniformly. The portion Sa of the decorative sheet S is expanded scarcely because the portion Sa is cooled by the transfer of heat from the portion Sa to the female mold 20 by conduction and because of the frictional resistance of the outer peripheral section 41 of the parting surface 40 of the female mold 20. After the decorative sheet S has been expanded to the shape ④, only the portion Sb, i.e., a decorating portion, to be brought into close contact with the cavity surface 22 is expanded.

Since the parting surface 40 of the female mold 20 has the outer peripheral section 41, and the inner peripheral section 42 formed in a concavely curved shape, the portion Sc of the decorative sheet S corresponding to the inner peripheral section 42 is expanded to some extent and is able to take part of a distortion of the decorative sheet S. Therefore, a strain in the decorating portion Sb of the decorative sheet is small and hence the decorative sheet S is difficult to be broken or creased to cause faulty injection molding. The mechanism of expansion of the decorative sheet S will more quantitatively be described. When the injection mold 10 is in the state shown in FIG. 3, $$L = LSc + LSb + LSc$$

where L is the length of the expandable portion of the decorative sheet S, LSc is the width of the portion Sc of the decorative sheet S corresponding to the inner peripheral section 42 of the parting surface 40, and LSb is the length of the decorating portion Sb of the decorative sheet S corresponding to the cavity surface 22. Therefore, $$\in = \Delta L/L = \Delta L/(LSc + LSb + LSc)$$

where $\in$ is strain of the decorative sheet S, and $\Delta L$ is an expansion of the decorative sheet S.

On the other hand, when the injection mold 50 shown in FIGS. 8 and 9 employed in the conventional foil-decorating injection molding machine is used, only the decorating portion Sb of the length LSb is subject to expansion. Therefore, $$\in' = \Delta L/L' = \Delta L/LSb$$

Since L>L' (=LSb), $\in < \in'$. Thus, the strain $\in$ produced by the injection mold 10 in the decorative sheet S is smaller than the strain $\in'$ that is produced in the same decorative sheet S by the injection mold 50 of the conventional foil-decorating injection molding machine.

Figure 4:
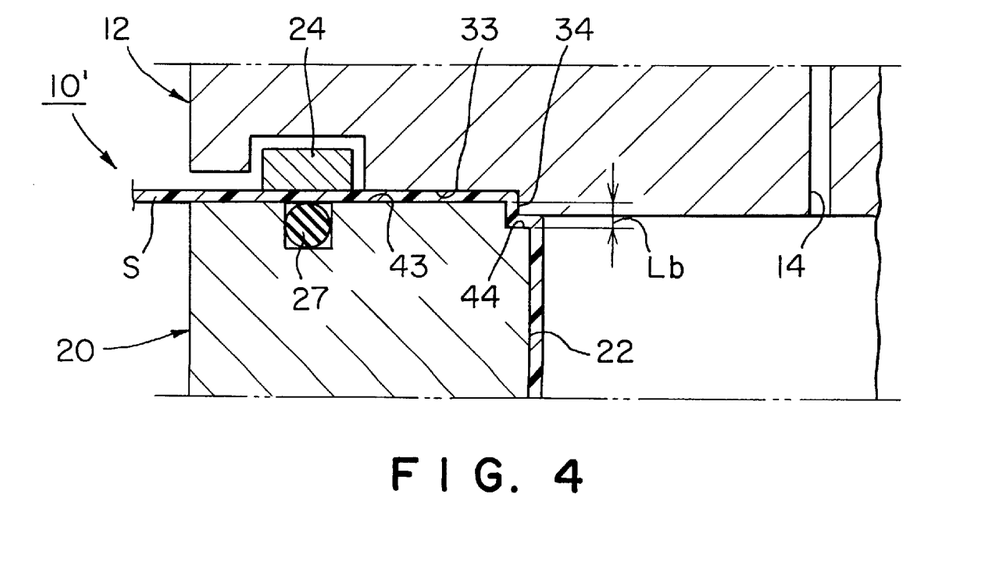
FIG. 4 is an enlarged, fragmentary sectional view of an essential portion of an injection mold having a male mold and a female mold and employed in a foil-decorating injection molding machine in another embodiment according to the present invention.
Figure 5:
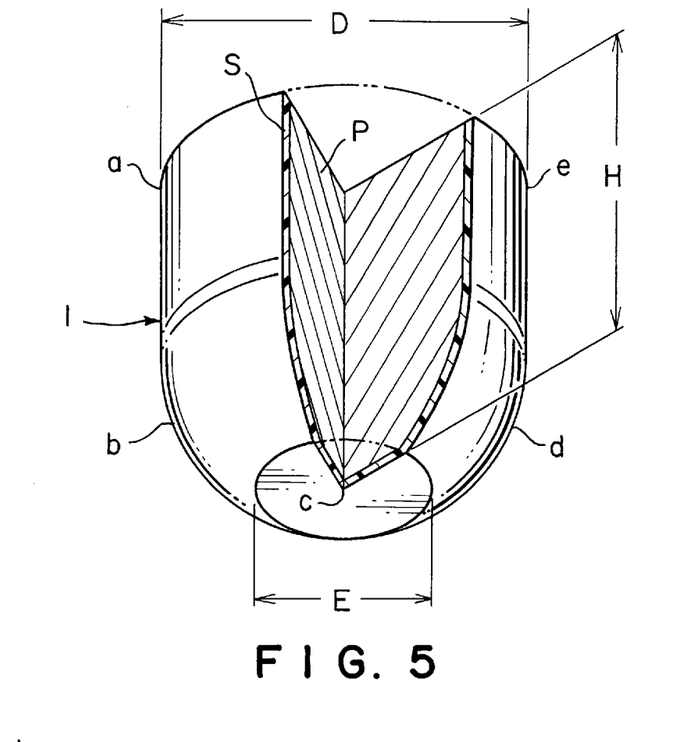
FIG. 5 is a perspective view of a decorated molding to be formed by a foil-decorating injection molding machine in accordance with the present invention.

Experimental preforming operations were conducted to verify the strain reducing effect of the present invention by using a foil-decorating injection molding machine in Example A of the present invention provided with the injection mold 10 (La (depth of the inner peripheral section 42)=10 mm, LSa=7 mm, LSc=10 mm), a foil-decorating injection molding machine in Example B of the present invention provided with an injection mold 10' shown in FIG. 4 having a female mold 20 provided with a parting surface consisting of an outer peripheral section 43 and an inner peripheral section 44 of a depth Lb of 2 mm, and a male mold 12 having a parting surface consisting of an outer peripheral section 33 and an inner peripheral section 34 respectively corresponding to the outer peripheral section 43 and the inner peripheral section 44 of the female mold 20, and a conventional foil-decorating injection molding machine in Comparative example provided with the injection mold 50 shown in FIGS. 8 and 9. Expansions of portions of the decorative sheet S corresponding to portions a, b, c, d and e on the surface of a molding 1 (FIGS. 2, 5 and 9) were represented by thickness change ratios dt/t, where t is the thickness of the decorative sheet S before preforming, and dt is a thickness reduction due to preforming. Measured results are tabulated in Table 1. The thickness change ratio dt/t was employed because there is a positive correlation between the thickness change ratio dt/t and the strain $\Delta L/L$ and it is easier to measure the thickness change ratio dt/t than to measure the strain $\Delta L/L$. Measured values for the portions d and e were omitted because the same were approximately equal to those for the portions b and a. Moldings of the same shape as shown in FIG. 5 were formed. The width LSc of the portion Sc of the decorative sheet S corresponding to the inner peripheral section 42 of Example A and the width LSc of the portion Sc of the decorative sheet S corresponding to the inner peripheral section 42 of Example B are different from each other. The widths LSa of the portions Sa of the decorative sheets S corresponding to the outer peripheral sections 41 and 43 of Examples A and B, and the lengths LSb of the decorating portions Sb of the decorative sheets S corresponding to the cavity surface 22 of Examples A and B are equal to each other.

TABLE 1

|  | L | a | b | c |
|---|---|---|---|---|
| Comparative example | 0 | 0.16 | 0.64 | 0.50 |
| Example B | 2 | 0.10 | 0.56 | 0.40 |
| Example A | 10 | 0.04 | 0.44 | 0.30 |

Figure 6:
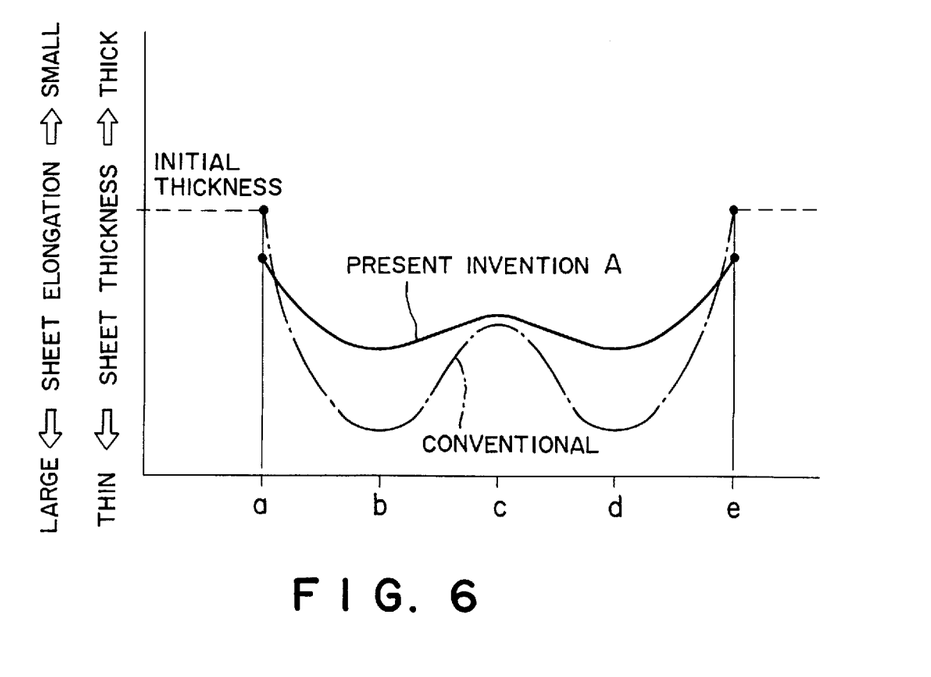
FIG. 6 is a graph showing the results of experiments conducted to verify the effects of the foil-decorating injection molding machine of the present invention.

FIG. 6 shows values of thickness of portions of the decorative sheets S corresponding to the portions a, b, c, d and e on the surface of the molding 1 (FIGS. 2, 5 and 9), i.e., values corresponding to the expansions of the same portions of the decorative sheets S. As is obvious from FIG. 6, the decorating portion Sb of the decorative sheet S expanded by Example A is less subject to local distortion than that expanded by Comparative example, and the thickness of the former is more uniform than that of the latter.

Figure 7:
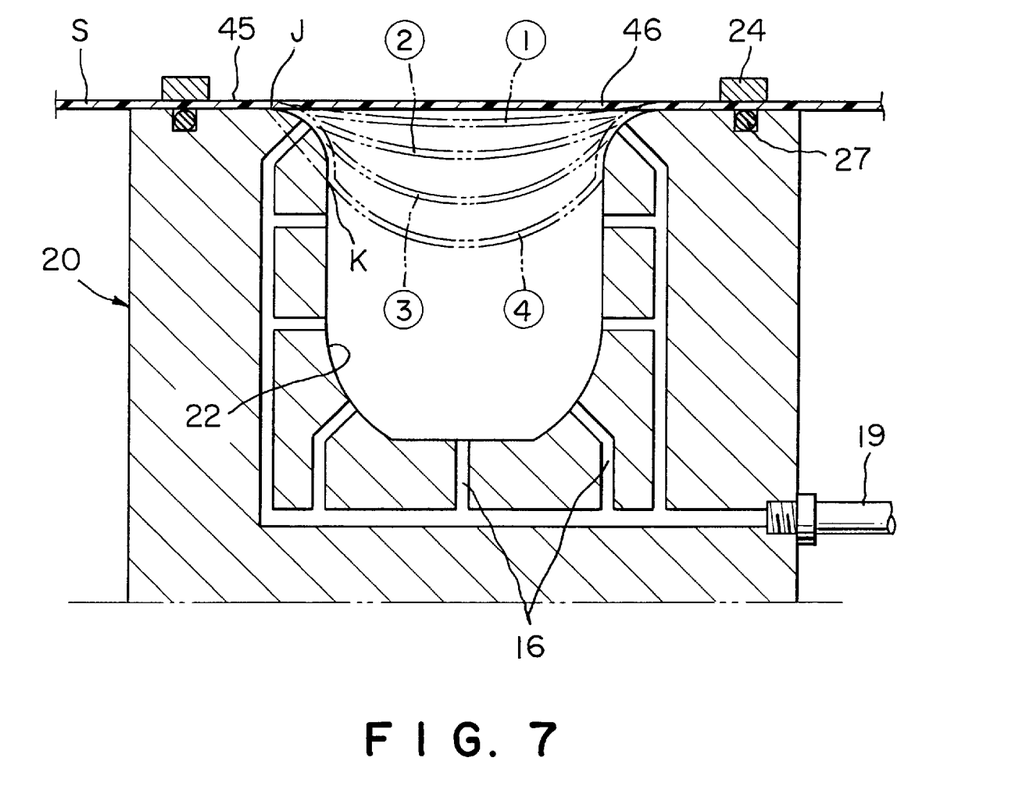
FIG. 7 is a schematic sectional view of a female mold included in an injection mold of assistance in explaining the relation between the shape of an inner peripheral section of the parting surface of the female mold and the expansion of a decorative sheet.

If a foil-decorating injection molding machine is provided with an injection mold having a female mold 20 provided with a parting surface having an outer peripheral section 45, and an inner peripheral section 46 smoothly merging into the outer peripheral section 45 at the inner edge J of the outer peripheral section 45 and into a cavity surface 22 at an edge K, and formed in a convexly curved shape as shown in FIG. 7, the area of contact of the decorative sheet S with the inner peripheral section 46 of the parting surface increases as the decorative sheet S is distorted in shapes ①-②-③-④ in that order. Although the female mold 20 shown in FIG. 7, as compared with the female mold 20 of the conventional injection mold 50, is effective in reducing strain, the strain reducing effect of the female mold 20 shown in FIG. 7 is not as high as those of the female molds 20 of the injection molds 10 and 10' of the present invention.

Although the invention has been described in its preferred form with a certain degree of particularity, obviously many changes and variations are possible therein. It is therefore to be understood that the present invention may be practiced otherwise than as specific ally described herein without departing from the scope and spirit thereof.

What is claimed is:

1. A foil-decorating injection molding method, comprising the steps of:

providing an injection mold having a female mold provided with a cavity surface for forming a cavity, and a parting surface, and a male mold having a parting surface to be engaged with the parting surface of the female mold when the injection mold is closed and capable of being moved relative to the female mold, the parting surface of the female mold comprising an outer peripheral section cooperable with the parting surface of the male mold to hold a decorative sheet therebetween, and an inner peripheral section extending between an inner edge of the outer peripheral section and an outer edge of the cavity surface, said inner peripheral section having a concave shape and being related with a corresponding section of the parting surface of the male mold to hold between the inner peripheral section and said corresponding section a residual portion of the decorative sheet which is to extend beyond a product molded in said cavity when the respective parting surfaces of the male and female molds are engaged, and suction holes opening in the cavity surface and connected to a vacuum source;

feeding the decorative sheet into a space between the respective parting surfaces of the male and female molds by a decorative sheet feed mechanism;

fixedly holding the decorative sheet on the outer peripheral section of the parting surface of the female mold;

expanding the decorative sheet so that the decorative sheet sticks closely to the cavity surface of the female mold by applying suction to the decorative sheet through the suction holes;

clamping together the male mold and the female mold so that the decorative sheet is held between the respective parting surfaces of the male mold and the female mold; and injecting a molten resin through the male mold into a cavity defined by the male mold and the decorative sheet for injection molding.

2. The method of claim 1, wherein the female mold is provided with suction holes opening in the inner peripheral section of the parting surface, and connected to the vacuum source comprising the step of applying suction to the decorative sheet through the suction holes opening in the inner peripheral section.

3. The method of claim 1, wherein the outer peripheral section of the parting surface of the female mold is flat.

4. The method of claim 1, further comprising a sheet holding means for fixedly holding the decorative sheet on the outer peripheral section of the parting surface of the female mold.

5. The method of claim 4, further comprising the step of fixedly holding the decorative sheet on the outer peripheral section of the parting surface of the female mold by the sheet holding means.

6. The method of claim 4, further comprising an elastic sealing means disposed on the outer peripheral section of the parting surface of the female mold at a position corresponding to the sheet holding means.

7. The method of claim 6, further comprising the step of sealing using the elastic sealing means.

* * * * *